(12) United States Patent
Watano et al.

(10) Patent No.: US 6,997,408 B2
(45) Date of Patent: Feb. 14, 2006

(54) MOTOR CONTROL CIRCUIT FOR PAPER SHREDDERS

(75) Inventors: Hiroaki Watano, Tokyo (JP); Hiromichi Omura, Matsue (JP)

(73) Assignees: Nakabayashi Co., Ltd., (JP); Mitsubishi Denki Kabushiki Kaisha, (JP)

( * ) Notice: Subject to any disclaimer, the term of this patent is extended or adjusted under 35 U.S.C. 154(b) by 220 days.

(21) Appl. No.: 10/221,371

(22) PCT Filed: Jan. 15, 2002

(86) PCT No.: PCT/JP02/00208

§ 371 (c)(1),
(2), (4) Date: Sep. 11, 2002

(87) PCT Pub. No.: WO02/055204

PCT Pub. Date: Jul. 18, 2002

(65) Prior Publication Data

US 2003/0057305 A1    Mar. 27, 2003

(30) Foreign Application Priority Data

Jan. 16, 2001   (JP) ............................. 2001-007888

(51) Int. Cl.
*B02C 25/00*    (2006.01)
(52) U.S. Cl. ........................... 241/30; 241/36; 241/236
(58) Field of Classification Search ................ 241/30, 241/34, 36, 236, 33, 35
See application file for complete search history.

(56) References Cited

U.S. PATENT DOCUMENTS 4,936,517 A   6/1990   Kammerer et al.

FOREIGN PATENT DOCUMENTS

| EP | 1177832 | 2/2002 |
|----|---------|--------|
| JP | 58-199052 | 11/1983 |
| JP | 2000-288417 | 3/1999 |
| JP | 2000-237615 | 9/2000 |
| WO | 0048737 | 8/2000 |

*Primary Examiner*—Mark Rosenbaum
(74) *Attorney, Agent, or Firm*—Thompson Hine LLP

(57) ABSTRACT

A paper shredder enables to control power consumption and achieve energy saving by realizing a torque characteristic of low torque at high speed or high torque at low speed keeping an output of a motor within a steady level. This circuit adopts a paper shredder structured with a driving motor for a rotary cutter having an inverted linear flow characteristic between rotation speed and torque and a control circuit composed of a detecting block for said rotation speed of said motor, a voltage control block for restricting a voltage output of said motor within a certain range in accordance with said rotation speed, and a current and voltage detecting block for monitoring a current flow of said motor. While a voltage is decreased on account of motor rotation speed which correlates negatively with a torque increase of said motor in shredding papers, when a voltage is restricted to a minimum by said voltage control block, an operation of said motor is to be suspended or reversed in the case that a current detected by said current and voltage detecting block exceeds a certain level. If a motor current detected by said current and voltage detecting block exceeds a certain level, a motor operation is to be suspended or reversed by a delaying circuit.

5 Claims, 2 Drawing Sheets

MOTOR CONTROL CIRCUIT FOR PAPER SHREDDERS

BACKGROUND OF THE INVENTION

1. Field of the Invention

The present invention relates to a paper shredder for disposing papers with a rotary cutter driven by a motor and especially controls over the paper shredder capable to shred effectively by controlling motor torque in accordance with a supply of papers to be shredded.

2. Description of the Related Art

A paper shredder that shreds with high torque by controlling a rotary cutter to slow-speed rotation as overloaded and shreds speedy with low torque by controlling said rotary cutter to high-speed working as low loaded has been well known. The above technical idea enables to shred continuously without suspending a shredding operation, enhance operation efficiency and also solve troublesomeness in an operation control. Examples of such idea, that is Japanese Open Gazette No. H5-92143, Japanese Open Gazette H5-92144 or Japanese Open Gazette No. 2000-237615 can be referred.

SUMMARY OF THE INVENTION

Shredding capacity and speed are keys to efficiency of a paper shredder and in general, the higher a shredding capacity is and the faster shredding speed is, the better efficiency of a paper shredder is. On the other hand, if the product of a shredding capacity and shredding speed becomes higher, a maximum power output required to a motor also becomes higher, which results in more power consumption. If a shredding capacity is therefore enhanced, energy saving cannot be achieved. Also, as a high capacity motor brings a problem of a machine being oversized and heavy, aforementioned examples try to shred appropriately with a relatively small motor.

Further, a conventional paper shredder suspends power supply owing to a function of a circuit breaker against high voltage current caused when power consumption of a motor leaps upward as overloaded. To avoid this trouble, mostly a motor is controlled to suspend or reverse on detect of an overload. However, a load fluctuates during a shredding operation and an instant overload is frequently produced because of folds and wrinkles of papers. Accordingly, suspension of a shredding operation has frequently occurred for an instant overload during a shredding operation, especially a high loads operation and therefore, shredding operation has been inefficient. In short, when a continuous run with high loads is inevitably required for mass shredding of such as paper at a time, a contradiction is nevertheless caused that is an operation tends to be suspended under the necessity of an efficient operation.

However, since such an overload arises from wrinkles of a paper and is instantaneous, an overloading status does not continue to the extent that a circuit breaker is actuated. For that reason, a more stable continuous run can be carried out compared to conventional examples by controlling suspension of a shredding operation with functions that a reverse operation is actuated just before a circuit breaker works and a suspend operation is actuated only when an overloading status continues for a certain amount of time. Shredding efficiency will be greatly improved with a condition set forth as explained above.

Since a conventional well-known induction motor provides a start up capacitor therewith, a circuit breaker will not be actuated despite a flow of a powerful current, for example 16 Ampere at 200 Watt and 35 A at 400 W for a moment, when the induction motor is started or chewed up or when torque rises in a low rotation range because a time of mentioned current's flow is below one second. As a result, the same feature can be observed. However, as a width of effective rotation range is narrow compared to a direct-current motor, power as supplied is not effectively utilized.

The present invention is to solve a conventional problem as described above and to disclose a paper shredder capable to control power consumption and advance energy saving by means of realizing a torque characteristic of low torque at high speed or high torque at low speed keeping an output of a motor within a steady level. Also, the present invention has an object to disclose a paper shredder capable to enhance shredding efficiency by means of lessening a frequency of suspension and reverse with a system that suspension and reverse are actuated after elapse of a certain time even if an overload is detected at a low rotation range.

To achieve the above object, the present invention adopts a paper shredder structured with a driving motor for a rotary cutter having an inverted linear flow characteristic between rotation speed and torque, and a control circuit composed of a detecting block for said rotation speed of said motor, a voltage control block for restricting a voltage output of said motor within a certain range in accordance with said rotation speed, and a current and voltage detecting block for monitoring a current flow of said motor. While a voltage is decreased on account of motor rotation speed which correlates negatively with a torque increase of said motor in shredding papers, when a voltage is restricted to a minimum by said voltage control block, an operation of said motor is to be suspended or reversed in the case that a current detected by said current and voltage detecting block exceeds a certain level. In this sentence, "inverted linear" is used that rotation speed and torque of a motor have an inverse proportion in each other.

An output of said motor is restricted at below a certain level throughout all operation ranges of motor rotation speed by controlling an impressed voltage with said voltage control block in accordance with said rotation speed of said motor. Especially, to avoid an increase of a motor output (required power) when a torque load is high, an impressed voltage is restricted by said voltage control block in accordance with a decrease of said rotation speed and gradually decreased to a certain voltage. In addition, said current and voltage detecting block constantly monitoring a driving current and a voltage has a function to suspend or reverse a motor operation to prevent paper jam or failure of a motor in the case that a motor current exceeds a certain current level by a current increases upon further deceleration of rotation speed after a voltage has been gradually decreased to a minimum. Also, said detecting block in claim 2 actuates a delay circuit such as a timer to suspend or reverse a motor operation after elapse of a certain delay time if a current exceeds a certain level.

DESCRIPTION OF THE PREFERRED EMBODIMENT

Figure 1:
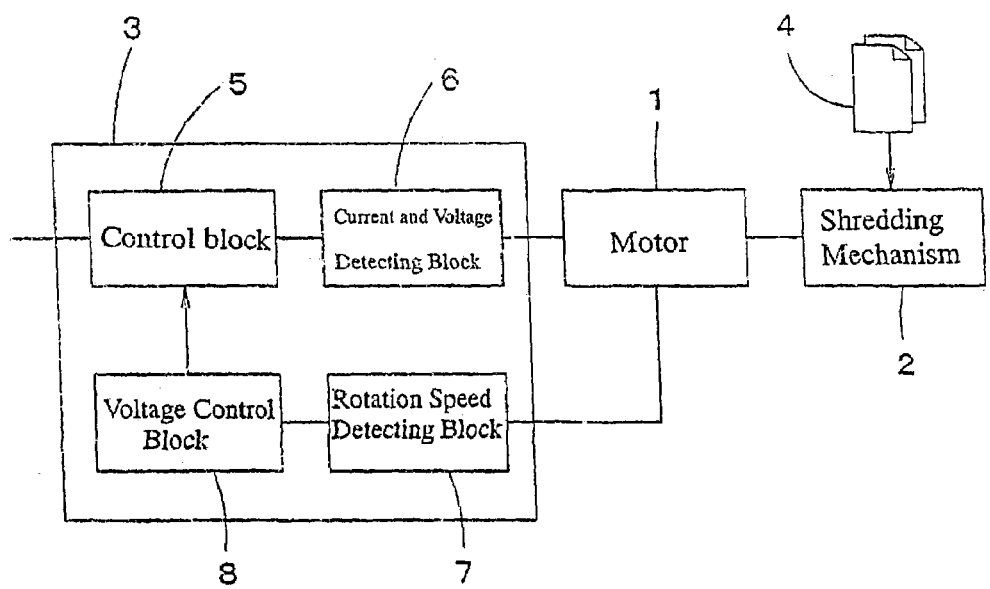
FIG. 1 is a block diagram showing a control circuit in the present invention.

Hereinafter, preferred embodiments are discussed referring to attached drawings. FIG. 1 is one of preferable embodiments of a control circuit in the present invention. 1 is a motor for driving a rotary cutter in a paper shredder machine. In this embodiment, rotation speed and torque have an inversed linear correlation with each other if a voltage is a certain level. For example, a direct brushless motor can be adapted. 2 is a shredding mechanism having said rotary cutter therewithin, 3 is a control circuit for controlling On-Off or obverse-reverse rotation of said motor, and 4 is a paper to be shredded. A detailed block for said control circuit 3 is composed of a control block 5, a current and voltage detecting block 6, a rotation speed detecting block 7, and a voltage control block 8. In this block, said current and voltage detecting block constantly detects a current flow or a voltage for preventing said motor 1 from burned due to a sharp rise in a current which is caused when rotation speed of said motor 1 decelerates below a certain level and has a function to actuate a timer (not drawn) to suspend and reverse rotation of said motor 1 with said control block 5 after elapse of a certain time (for example, one second) when said rotation speed reaches to said certain level. Said rotation speed detecting block 7 constantly measures rotation speed (the number of rotation) of said motor and feeds this rotation speed to said voltage control block 8. This voltage control block 8 conducts voltage control in accordance with current rotation speed on basis of a predetermined function and feedbacks to said control block 5. Then, an appropriate voltage is generated within said control block 5 and runs said motor 1 via said current and voltage detecting block 6. Accordingly, these blocks have a kind of negative-feedback circuit structure.

Figure 2:
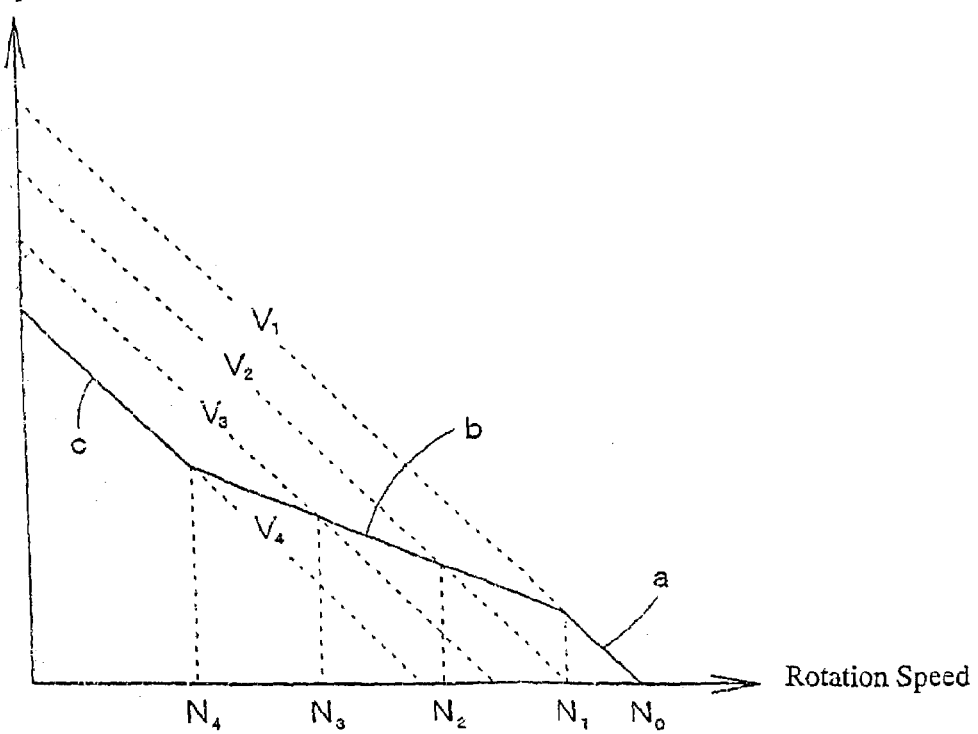
FIG. 2 is a graph showing characteristics between rotation speed of a motor and torque generation.

FIG. 2 indicates a torque characteristic in accordance with rotation speed of said motor when said control circuit shown in FIG. 1 is utilized. As shown with V1 to V4, said torque characteristic of said motor 1 has an inverse linear correlation between rotation speed and torque if a voltage V is a certain level. Said rotation speed and said torque shift as indicted with line a when said motor is driven with a voltage V1 during a normal operation. In this situation, if a paper over prescribed thickness is to be shredded while said motor is driver, with a voltage V1, said rotation speed of said motor declines along with said line a due to an increase of a load. If this situation continues, said torque increases as against a decrease of said rotation along with a line V1. At the same time, an output of said motor becomes too high and therefore, energy saving cannot be realized as a paper shredder. In addition, as a problem that a breaker easily works to operate will occur due to a current increase for power source, control for restricting a motor output is conducted to avoid said problem by demoting an impressed voltage to V2 when said rotation speed reaches to a set level. In the case that a load for said motor 1 is still high, said torque characteristic is lessened to restrict an output of said motor by repeating said control. A voltage V4 is a lower limit of an impressed voltage and therefore, even if said control is repeated, a voltage will not go down below said limit. As a result, when overload shredding is continued, the relationship between rotation speed and torque will shift along lines a-b-c and an output of said motor is restricted within a certain level. Further, the relationship between said rotation speed of said motor and a voltage to be restricted is predetermined. Accordingly, if rotation speed is decelerated to said set level, a restriction level is lowered one rank and on the other hand, if said rotation speed is accelerated to a set level owing to alleviation of a load, said restriction level is heightened one rank realizing a capacious operation of said motor.

Next, when said overload is continued, an impressed voltage maintains V4 by said voltage control and the relationship between rotation speed and torque shifts along with a line c. However, if said overload is held still, a motor current will increase creating a cause of trouble of such as said motor. Therefore, said current and voltage detecting block 6 is to detect a current flow and suspend or reverse rotation of said motor with a timer if a current level reaches to a set level. A prevailing delay circuit is included in a general idea of a timer.

Figure 3:
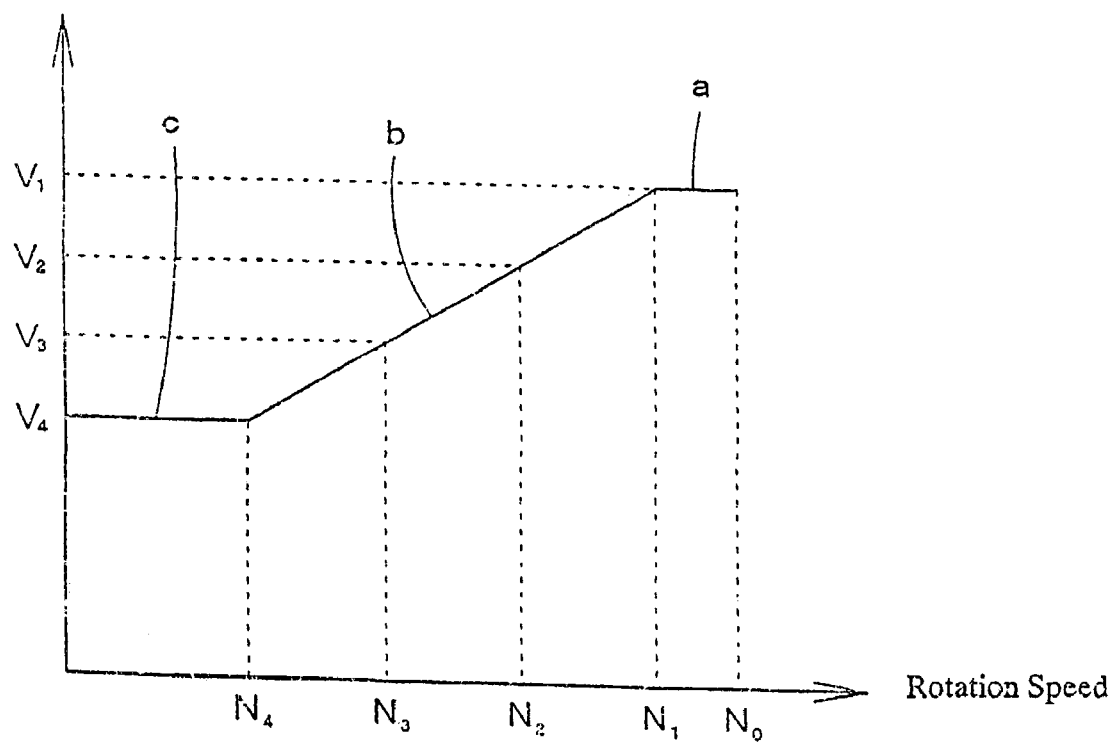
FIG. 3 is a graph showing the relationship between the number of motor rotation and a restricted voltage.

FIG. 3 indicates the relationship between rotation speed of said motor 1 and a restriction voltage while controlled as indicated in FIG. 2. Each of lines a-b-c corresponds to those of FIG. 2. In other words, while a voltage keeps a certain level at the beginning of deceleration of rotation speed of said motor, said voltage is gradually restricted as indicated by said line b if said rotation speed is decelerated to N1. If said rotation speed reaches to said limit level, a voltage is to keep a certain level as indicated by said line c. Said line c represents a voltage V4. Since proper shredding cannot be conducted with a voltage below V4, a voltage is controlled not to lower than V4.

A paper shredder adapting a structure of the present invention can achieve energy saving since an output of a motor is controlled not to exceed a certain level. Also, a motor can be downsized for the reason that an output of a motor can be restricted below a certain level in all operation ranges of said motor since an impressed voltage is gradually decreased in accordance with rotation speed of said motor by adopting a characteristic whereby torque increases in an inverse correlation with said rotation speed of said motor. Furthermore, even if a motor current rises upon a torque increase when a voltage is lowered to a limit level by a voltage control, said motor will not be overheated since an operation of said motor is to be suspended or reversed when an current exceeds a certain level. In addition, capacious control can be realized by suspending or reversing said motor after a certain delay time.

What is claimed is:

1. A motor control circuit for paper shredders comprising of
   a paper shredder that is composed of a driving motor for a rotary cutter having an inverted linear flow characteristic between rotation speed and torque, a detecting block for said rotation speed of said motor, a voltage control block for restricting a voltage output of said motor within a certain range in accordance with said rotation speed, and a current and voltage detecting block for monitoring a current flow of said motor;
   and characterized by:
   decreasing a voltage gradually in accordance with decreasing of said rotation speed which correlates with a torque increase of said motor in shredding papers, and
   suspending or reversing a motor operation in the case that a current detected by said current and voltage detecting block exceeds a certain level when a voltage is restricted to a minimum within said certain range by said voltage control block.

2. A motor control circuit for paper shredder according to claim 1, wherein a motor operation is suspended or reversed via a delay circuit in the case that a motor current detected by said current and voltage detecting block exceeds said certain level.

3. A motor control circuit for a paper shredder according to claim 1, wherein a motor operation is suspended or reversed after lapse of a certain time when a motor current detected by said current and voltage detecting block exceeds said certain level.

4. A motor control circuit for paper shredders comprising:
- a paper shredder including a driving motor for a rotary cutter;
- a rotational speed sensor for detecting a rotational speed of the motor;
- a controller for controlling a voltage applied to the motor; and
- a current sensor for detecting a current in the motor;
- wherein the controller is operably connected to the rotational speed sensor for receiving a signal therefrom;
- wherein the controller is operable to apply a voltage to the motor within a set voltage range, at least in part, as a function of the detected rotational speed of the motor;
- wherein the controller is operable to decrease the voltage applied to the motor gradually in response to a detected decrease in rotational speed of the motor;
- wherein the controller is operably connected to the current sensor for receiving a signal therefrom; and
- wherein the controller is operable to suspend or reverse the motor operation when the current detected by the current sensor exceeds a certain level and the voltage applied to the motor by the controller has already been reduced to a set minimum within the set voltage range.

5. A method for controlling the motor of a paper shredder comprising the steps of:
- detecting a rotational speed of the motor;
- detecting a current through the motor;
- reducing a voltage applied to the motor in response to a detected reduction in the rotational speed of the motor;
- comparing the voltage applied to the motor to a preset minimum voltage;
- comparing the detected current through the motor to a preset maximum current; and
- suspending or reversing the motor operation when the detected current is greater than or equal to the preset maximum current and the voltage applied to the motor is less than or equal to the preset minimum voltage.

* * * * *